Dec. 20, 1960
R. E. MOULE ET AL
2,965,206
CENTRIFUGAL CLUTCH
Filed Dec. 2, 1957
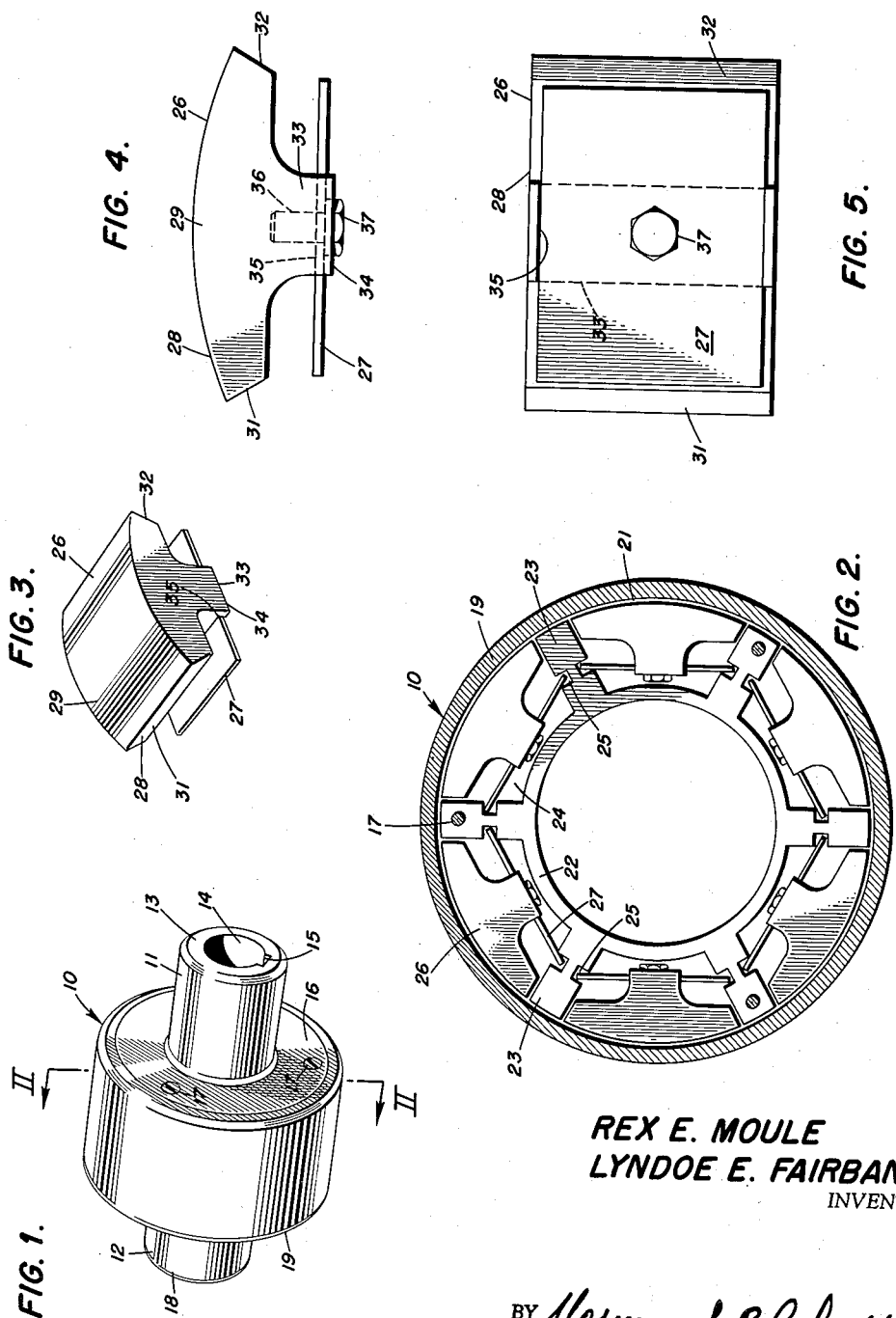
REX E. MOULE
LYNDOE E. FAIRBANKS
INVENTORS
BY Norman S. Blodgett
ATTORNEY United States Patent Office 2,965,206
Patented Dec. 20, 1960

2,965,206

CENTRIFUGAL CLUTCH

Rex E. Moule, Holden, and Lyndoe E. Fairbanks, Worcester, Mass., assignors, by mesne assignments, to Formsprag Company, Warren, Mich., a corporation of Michigan Filed Dec. 2, 1957, Ser. No. 700,204

2 Claims. (Cl. 192—105)

This invention relates to centrifugal clutches and more particularly to clutches of the type having revolving shoes which are forced outwardly by centrifugal force into frictional engagement with the surrounding cylindrical surface.

Clutches of this type have been constructed heretofore in the form of two cooperating members, one member having outwardly-projecting radial ribs forming pockets to receive friction shoes, and the other member having a cylindrical portion which surrounds the shoes and provides the friction surface for contact with the shoes. Each of the shoes is provided with a layer of organic material to provide a friction surface for contact with the cylindrical surface of the outer member of the clutch; this material is generally a fabric of the type known as "brake lining." In many cases, where it is desirable to have an initial period in which the shoes do not contact the outer cylindrical surface and no power is transmitted through the clutch, it has been the practice to provide the shoes with springs. This type of clutch is shown and described in the patent of Rawson, No. 2,429,697. The spring so provided permits contact between the shoe and the outer cylindrical surface only when the speed of the driven element produces a centrifugal force on the shoe sufficient to overcome the inwardly-directed spring forces. Centrifugal clutches of the type described above have a number of deficiencies. For one thing, it is quite common for the friction generated by the contact to generate sufficient heat to start incipient cracking or checking on the outer cylindrical surface. This checking becomes progressively worse until the clutch fails by bursting of the outer member unless the outer member has been replaced. Also, the spring construction shown in the cited patent is complicated and difficult to maintain. Furthermore, the construction is such that it is not possible to replace a spring in a given shoe with a spring of a different thickness because doing so would change the spacing between the friction surfaces. These and other difficulties experienced with the prior art devices have been obviated in a novel manner by the present invention.

It is therefore an outstanding object of the invention to provide a centrifugal clutch having friction surfaces formed of such material as to reduce checking to a minimum.

Another object of this invention is the provision of a centrifugal clutch having a novel spring construction which is simple to manufacture and easy to maintain.

A still further object of the present invention is the provision of a centrifugal clutch having friction surfaces formed of unusual materials and providing an efficient spring system for maintaining the shoe out of engagement until the driven element reaches a predetermined speed.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

Figure 1 is a perspective view of a centrifugal clutch embodying the principles of the present invention, Figure 2 is a transverse sectional view of the clutch taken on the line II—II of Figure 1, Figure 3 is a perspective view of a shoe forming a part of the clutch, Figure 4 is an end view of the shoe, and Figure 5 is a plan view of the shoe.

Referring first to Figure 1, wherein are best shown the general features of the invention, the clutch, indicated generally by the reference numeral 10, is shown as comprising an inner driven member 11 and an outer output member 12. The inner member 11 is provided with a tubular stem 13 adapted to be connected to the shaft of a prime mover or the like. The stem 13 is provided with a bore 14 having a keyway 15. The inner member is also provided with a cover 16 which surrounds the stem 13 and is fastened to the inner member by means of screws 17. The outer member 12 is provided with a stem 18 adapted to be fastened to the shaft of a member which is to be driven. Integral with the inner end of the stem 18 is a housing 19 of circular tubular form.

Referring to Figure 2, it can be seen that the housing 19 is provided with an inner surface 21 of circular cylindrical form which is rather finely finished to give a smooth surface. The entire outer member 12 is integrally formed of gray cast iron. The inner member 11 is formed in the area which lies within the housing 19 in the form of a central tubular core 22 from which extend radial fins 23. The fins 23 are equally spaced about the core 22 and in the preferred embodiment there are six, thus defining six pockets 24 facing outwardly of the inner member. Removal of the cover 16 from the inner member reveals these pockets. The fins 23 extend outwardly into close proximity to the surface 21, but do not make contact therewith. Each of the ribs 23 is provided with a longitudinal groove 25 on each side thereof. Each of the grooves is a generally rectangular cross sectional form and extends the entire length of the rib. Within each of the pockets 24 lies a shoe 26 having a leaf spring 27 associated therewith.

The details of the shoe 26 on its associated spring 27 are best shown in Figures 3, 4 and 5. The shoe 26 has a main body 28 having a broad cylindrical surface 29. The surface 29 terminates in radial plane surfaces 31 and 32 while from the under surface of the main body 28 extends a radial boss 33 terminating in a chord-like plane surface 34 extending longitudinally of the shoe. A broad, shallow relief groove 35 having a plane bottom surface 40 extends across the surface 34 and in this groove resides the spring 27. A threaded aperture 36 extends into the shoe from the relief groove 35 centrally thereof. A bolt 37 passes through a suitable aperture in the spring 27 and is threadedly engaged with the aperture 36.

The spring 27 is formed of a stiff spring steel and is of a generally rectangular conformation. In the longitudinal direction it is, of course, slightly shorter than the shoe 26 in order to fit into the recess 35. In the transverse direction it extends outwardly and slightly beyond imaginary radial planes defined by the surfaces 31 and 32. The shoe 26 is formed of a brass composition containing copper; more specifically, the shoe is formed of a cast alloy containing five percent zinc, five percent lead, five percent tin and eighty-five percent copper. As is evident in Figure 2, when the shoe 26 resides within its respective pocket 24 between a pair of radial fins 23, the ends of the spring 27 reside in the grooves 25 in the same fins. The spring is retained by the groove and is not capable of being removed there-from except by longitudinal movement, this being possible when the cover 16 has been removed.

The operation of the invention will now be readily understood in view of the above description. The clutch is normally used to connect a shaft which is driven and a shaft which is to be driven. For instance, the inner member 11 may be mounted on the shaft of a prime mover and the outer member 12 may be mounted on the shaft of a machine which is to be driven. The torque available from a prime mover such as an electric motor is usually quite limited at low speed and, therefore, it is desirable not to connect the load to the prime mover until the latter has attained a reasonable speed. The prime mover rotates the inner member 11, but the shoes 26 do not contact the surface 21 of the outer member and, therefore, no torque is transmitted through the clutch to the machine which is to be driven. As the speed of the inner member increases, centrifugal force acts on the shoes 26 and forces them toward the surface 21. However, such movement is restrained by the leaf springs 27 associated with each of the shoes. As the speed of the inner member increases still further, the force on the shoe 26 causes the spring 27 to bend into a bow shape. Eventually, at a predetermined speed, the centrifugal force is great enough to cause the shoe 26 to overcome the resistance of the spring 27 and to contact the surface 21. The friction forces existing between the contacting surfaces 21 and the surface 29 of the shoe 26 are such as to cause the outer member 12 to be driven, thus driving the machine to which it is connected. It can be seen that the simple construction of the invention will permit operation fairly efficiently despite amounts of foreign matter that may gain entrance into the clutch. There are no bearing surfaces to interfere with operation because of dirt and the simplicity of a unitary shoe having no special lining attached thereto cannot be overestimated from a maintenance point of view. In the past it has always been supposed that shoes formed of bronze and similar copper-bearing materials would not function in a centrifugal clutch because of the fact that the friction forces would not be sufficient to transmit appreciable amounts of power. The applicants have discovered, however, that when the outer member is formed of gray cast iron and the shoes are formed of bronze or similar copper-bearing material the friction forces are, indeed, sufficient for the purposes of a centrifugal clutch. The most surprising feature, however, discovered by the inventor was that when a shoe of this material was used with a gray cast iron outer housing the amount and degree of checking was reduced appreciably. This unobvious result makes this type of construction very desirable, since checking is one of the major problems in the use of centrifugal clutches. Tests showed that using the materials of the specific embodiment of the invention results in 98.8% of the heat generated being absorbed by the shoes during continuous operation, whereas the known clutches of the centrifugal type, using shoes with brake lining, permit 34.5% of the heat generated to pass into the outer drum with the deleterious effects noted above.

It will be noted that the surface 40 of the groove 35 defines the position of the mating surface of the spring 27 relative to the cylindrical surface 29 of the shoe. It is this surface of the spring 27 which engages the inwardly-directed surfaces of the grooves 25 and determines the gap between the cylindrical surface 29 of the shoe and the inner surface 21 of the outer member. Therefore, the replacement of the spring with a spring of a different thickness, to obtain a different operating characteristic, does not change the gap between the friction surfaces.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A centrifugal clutch comprising a pair of coaxial, relatively rotatable first and second members, said first member providing an inner cylindrical drum surface and said second member having means providing a series of circumferentially spaced ribs having generally radially extending surfaces on opposite sides thereof, said members being axially telescoped with said ribs forming pockets therebetween surrounded by said drum surface, friction shoes located in the respective pockets, each shoe being formed with an external, cylindrically arcuate surface for frictional engagement with said cylindrical drum surface and having opposed, generally radial surfaces for engagement with said generally radial surfaces of adjacent ribs, each shoe being so proportioned that when a shoe is in contact with adjacent ribs a radial clearance exists between said arcuate surface of the shoe and said cylindrical drum surface, each shoe being provided with a radially inwardly directed boss centrally located circumferentially thereof and extending circumferentially along only a small portion of the shoe, said bosses each presenting a chord-like reference plane surface at the inner extremity of the boss thereof which is approximately co-extensive in axial dimension with the shoe and boss, and an elongated rectangular leaf spring fastened to each of said reference surfaces and substantially co-extensive in axial dimension with the latter, whereby said spring and reference surface have engagement over the entire area of the latter, each leaf spring extending substantial distances circumferentially from opposite ends of said reference surface, the shape and overall area of the spring on its outer radial surface approximating the shape and radially inwardly projected area of the arcuate surface of the shoe, said ribs being provided with axially extending grooves in said generally radial surfaces thereof in which the ends of a leaf spring are received and radially restrained.

2. A centrifugal clutch in accordance with claim 1, in which said friction shoes are formed of a copper alloy at said arcuate surfaces thereof, said cylindrical drum surface of said first member being cast iron and said shoe and drum surfaces being in direct metal-to-metal contact when centrifugally engaged.

References Cited in the file of this patent

UNITED STATES PATENTS

| 1,727,467 | Johnson | Sept. 10, 1929 |
| 1,870,649 | Rawson | Aug. 9, 1932 |
| 2,072,070 | Fisher | Feb. 23, 1937 |
| 2,089,080 | Valentine | Aug. 3, 1937 |
| 2,122,405 | Bockius et al. | July 5, 1938 |
| 2,178,527 | Wellman | Oct. 31, 1939 |
| 2,527,179 | Errig et al. | Oct. 24, 1950 |
| 2,747,713 | Light | May 29, 1956 |

FOREIGN PATENTS

| 199,796 | Great Britain | June 28, 1923 |